Dec. 30, 1952       E. B. ROBINSON       2,623,443
MANUFACTURE OF HELICALLY WOUND TUBES
Filed Feb. 28, 1948                    7 Sheets-Sheet 1
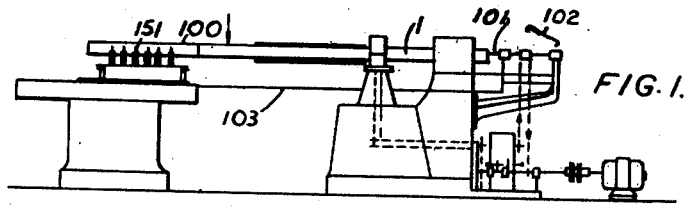
FIG. 1.
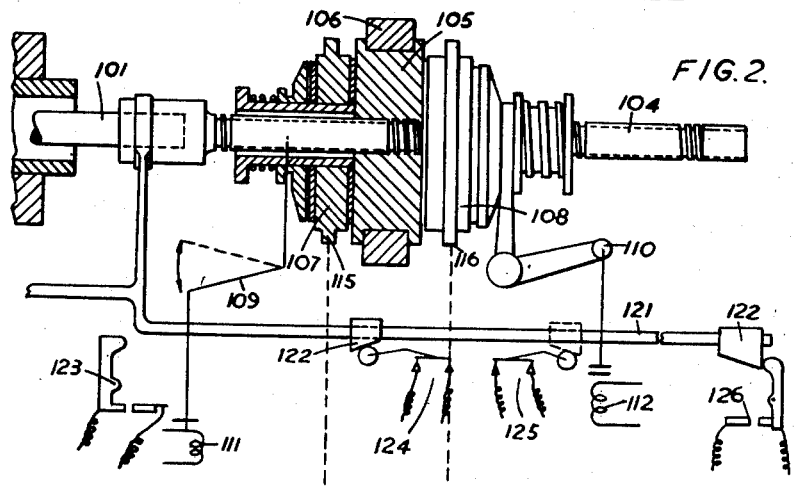
FIG. 2.
FIG. 3.
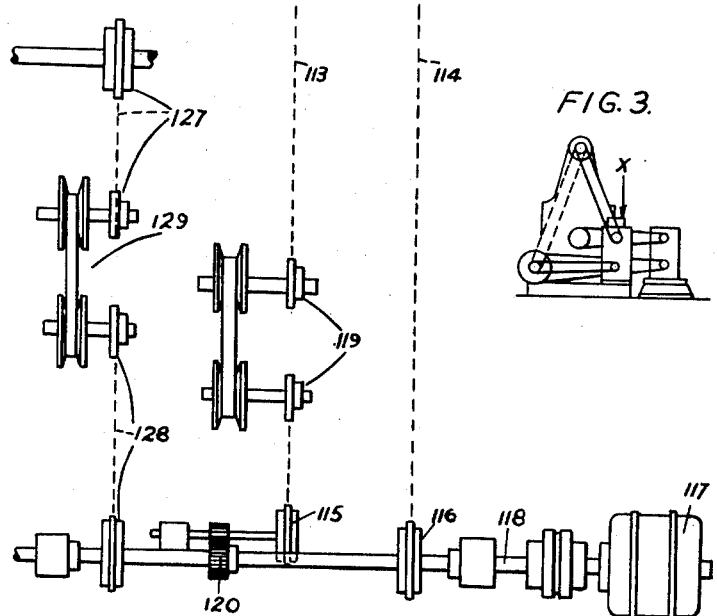
Inventor
Ernest Bradbury Robinson
By his attorneys
Howson and Howson

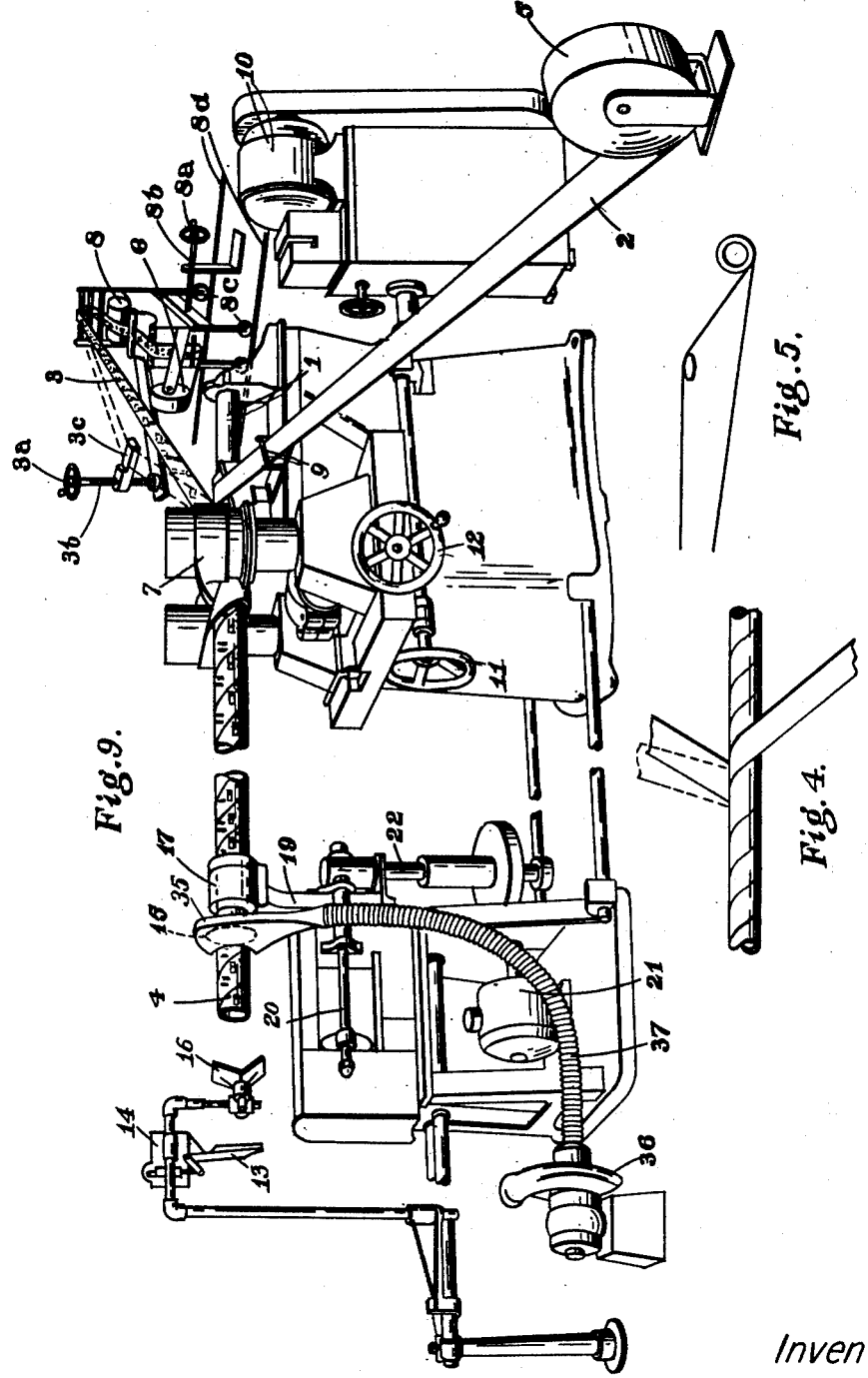

Dec. 30, 1952   E. B. ROBINSON   2,623,443
MANUFACTURE OF HELICALLY WOUND TUBES
Filed Feb. 28, 1948   7 Sheets-Sheet 3

Inventor
Ernest Bradbury Robinson
By his attorneys
Howson and Howson

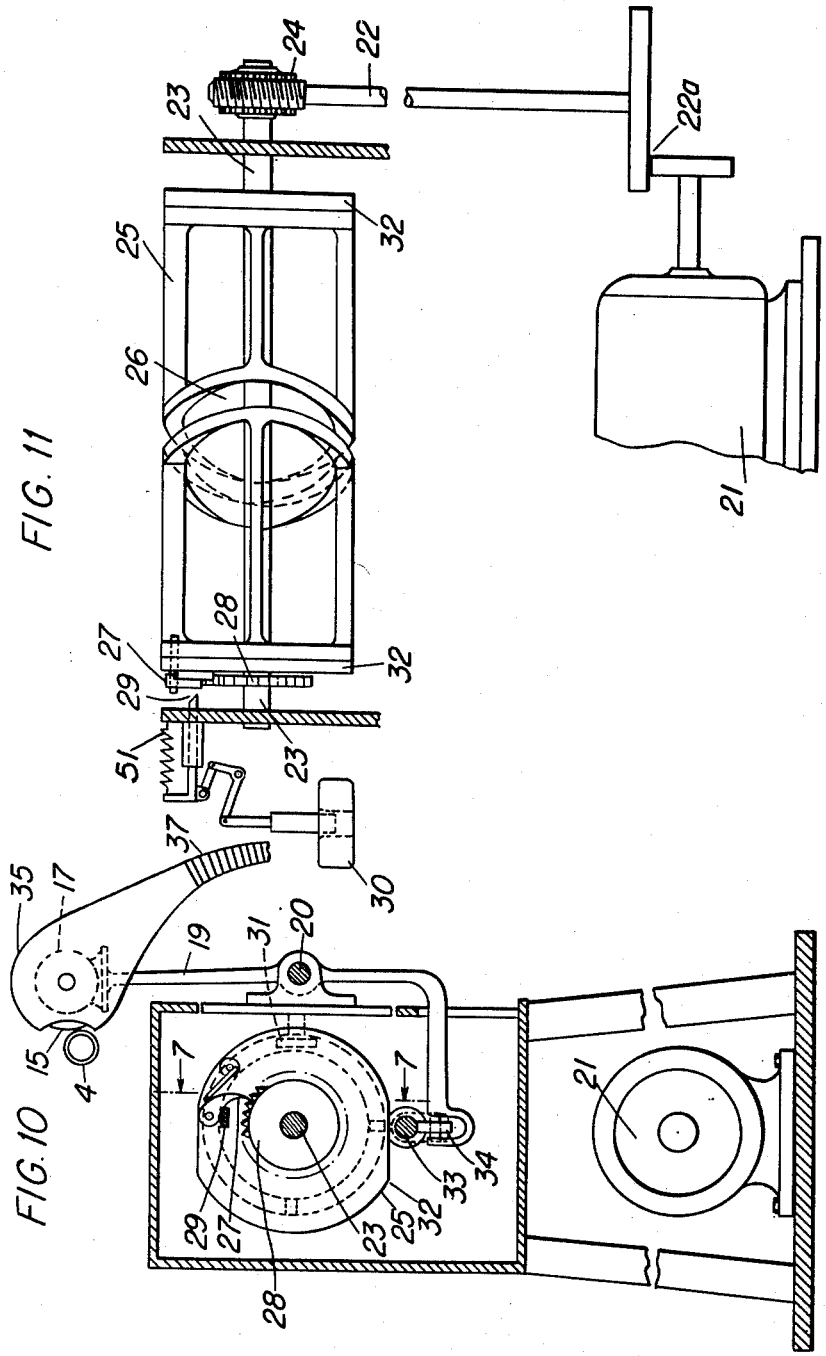

Dec. 30, 1952  E. B. ROBINSON  2,623,443
MANUFACTURE OF HELICALLY WOUND TUBES
Filed Feb. 28, 1948  7 Sheets-Sheet 6

*Inventor*
*Ernest Bradbury Robinson*
By his attorneys
Howson and Howson

Dec. 30, 1952 E. B. ROBINSON 2,623,443
MANUFACTURE OF HELICALLY WOUND TUBES
Filed Feb. 28, 1948 7 Sheets-Sheet 7
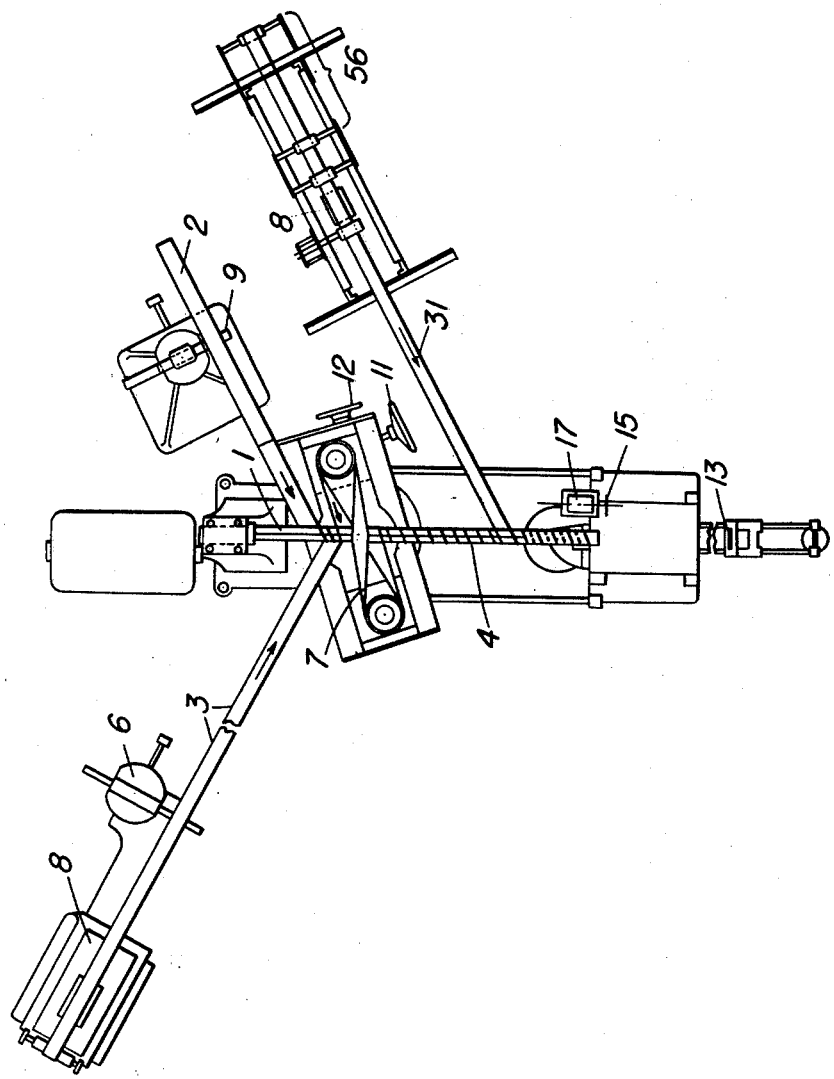
*Inventors*
*Ernest Bradbury Robinson*
By his attorneys
Howson and Howson Patented Dec. 30, 1952

2,623,443

UNITED STATES PATENT OFFICE 2,623,443

MANUFACTURE OF HELICALLY WOUND TUBES

Ernest Bradbury Robinson, Ashgate, Chesterfield, England

Application February 28, 1948, Serial No. 11,955
In Great Britain January 24, 1946

Section 1, Public Law 690, August 8, 1946
Patent expires January 24, 1966

9 Claims. (Cl. 93—80)

This invention is for improvements in and relating to the manufacture of helically wound tubes, and has particular reference to machines for the manufacture of such tubes.

In my copending U. S. patent application Ser. No. 726,467, filed February 5, 1947 (now Patent No. 2,623,445), there is described a method of producing helically wound tubing having on the exterior thereof a circumferentially disposed unitary pattern repeated along the length thereof which consists in winding an inner strip of ribbon helically on to a mandril to form an inner tubular layer, taking a further strip or ribbon having the said pattern repeated diagonally along it, and winding said further strip helically to form an outer tubular layer with the pattern disposed in rings on its exterior.

It should be explained that when cutting plain, i. e. unpatterned tubes, allowance for error due to variations such as winding differences are wholly immaterial in the production of standard lengths of plain tubes, but when dealing with lengths or containers having unitary patterns the errors are cumulative. Therefore it is obvious that the cuts will not always be in registry with the patterns and consequently tubes, rims or containers will be produced bearing fractions of patterns instead of whole patterns as is desirable.

An object of the invention is to avoid the aforesaid waste rims and also to provide means for producing patterned tubes each having a whole pattern or a plurality of whole patterns appearing on it.

It has been discovered that the above objects may be achieved by adhering to certain principles. One of these principles is that, irrespective of whether the tube is patterned or not, the cuts for any one tube must be made through the helically disposed edges of the strip at locations which are disposed on a straight line parallel to the tube axis or are angularly displaced relatively to each other by the same fraction of 360 degrees that the rim is a fraction of the height of a complete turn of the helix.

The invention therefore provides a machine for producing helically wound tubes comprising a mandril, means for winding strip material on the mandril so as to form tubing and means for cutting the tubing at spaced locations thereon in such manner that individual pairs of cuts for individual tubes (or for multiples thereof) intersect the helically disposed edges of the strip at locations thereon which are disposed on a straight line parallel to the axis of the tubing.

Another of the aforesaid principles is based on the assumption that a printing cylinder is employed to print patterns on the strip, and in this event it is necessary for the cylinder during one revolution to print one or more unitary patterns as distinct from including a fraction of a pattern. Where I speak of "unitary pattern," I refer to a pattern complete in itself, as contrasted with a pattern such as a "barber-pole" or other pattern having no identifiable beginning or end. The arrangement must be also such that a complete pattern or a multiple thereof appears in a predetermined length of the tubing. More specifically the first step in carrying out this principle is to determine the height of container or rim required; then the length of strip required to provide the rim with a complete pattern (or a multiple thereof) on it is determined by mathematical calculation and the arrangement is such that the printing cylinder prints one or more complete patterns of the determined length of the strip during each revolution thereof.

The invention therefore further provides apparatus for producing helically wound patterned tubes comprising a printing cylinder for printing on strip material, a mandril on which the strip is helically wound to form tubing, winding means for winding the strip on the mandril, means for cutting the tubing into lengths comprising cutter mechanism which traverses in a direction axially of the tube, and, for the purpose of ensuring that only a single complete pattern or a plurality of complete patterns according to the height of tube desired, means for arranging the printing cylinder to print one or more complete patterns or an exact multiple thereof for each complete revolution of the cylinder, and means for cutting the tubing at spaced locations thereon in such manner that individual pairs of cuts for individual tubes (or for multiples thereof) intersect the helically disposed edges of the strip at locations thereon which are disposed on a straight line parallel to the axis of the tubing or are angularly displaced relatively to each other in a direction at right angles to the axis by the same fraction of 360 degrees that the tube is a fraction of the height of a complete turn of the helix.

According to a feature of the invention the being-formed tubing is cut into lengths as it comes off the mandril and the cut is timed by a detector actuated by control marks on the strip.

It might be thought that satisfactory tubes could be produced on a machine for winding the strip material on to a mandril wherein the winding means and the cutter traversing means are driven at constant speeds; this is not the case however, because of uncontrollable variable factors which invariably result in the tube travelling in a direction towards the cutter at a speed which varied from the constant speed of the winding means. Consequently, according to this invention, means are provided functioning under the control of the moving tube or strip for varying automatically the relative speed of traverse of the being formed tube or cutting mechanism to maintain the required synchronism therebetween and to ensure that the tubing is in fact cut at the desired locations. It is to be understood that the cutting means may consist of a single cutter or a battery of cutters as desired.

The said timing may be effected by varying the speed of the tube winding means or by varying the speed of traverse of the cutter, through an adjusting mechanism. The speed of the tube winding means and/or the speed of traverse of the cutter mechanism may be varied by any suitable means automatically and the variation may be effected manually for initial setting. For example, the cutter traversing speed and/or the speed of the tube winding means may be varied automatically by control means influenced automatically by abnormalities such as control marks on the tube or strip (which may be constituted by parts of patterns on the strip) and also if desired by control means in conjunction with other means associated with the tube or strip such as for example the tube end; for this purpose the said control means may be arranged to actuate speed control units associated for example with the return traverse of the cutter mechanism; alternatively the control means may be arranged to vary a P. I. V. (positive, infinite, variable) drive (or a variable speed motor) for the cutter mechanism. In a further arrangement the inclination or position of the strip material leading to the mandril is varied to achieve the desired result.

If so desired there may be provided control marks (which may be constituted by parts of patterns on the strip material) indicating the desired cutting positions and by these marks or by the control marks or other means associated with the work, either tube or strip previously mentioned, it can be observed by a scanning unit whether the cuts are being made at the desired positions or not: the scanning unit then functions to effect the desired speed variation when necessary through the intermediary of suitable electronic apparatus.

By a "control mark," I mean an area which is so differentiated from the adjacent area as to serve as means to regulate the time of cutting either by a human operator or by automatic mechanism.

It is within the scope of the invention to perform the act of detection either on the tubing or as the strip is travelling to the mandril.

It should be also explained that when a single cutter on the winding machine is employed the tubing is cut at predetermined locations relatively to the pattern but this does not by itself result in the cut tubes being all of the same length. When a plurality of cutters is employed, however, it will be appreciated that, in addition to the tubes being cut at predetermined locations relatively to the pattern, all the containers are cut of uniform length on the winding machine by virtue of the cutters being fixed at equal distances apart. It is consequently preferred instead of adjusting the cutter traversing speed to adjust the tube production to maintain synchronism between the cutters and the pattern.

Means are preferably provided by which strip material of different widths may be wound and tubes of different lengths may be cut; in the event of such means being provided the aforesaid control means is adjusted so that the aforesaid desideratum is achieved irrespective of the width of strip material being wound or the length of tubing being cut at any one time.

In order that the nature of the invention may be more readily understood reference will now be made by way of example to the accompanying drawings in which, Figure 1 is a general view of a machine according to this invention.

Figure 2 is a part sectional view of the right hand end thereof.

Figure 3 is a detail showing a convenient position for a control device according to this invention.

Figure 4 is a scrap plan view showing the strips leading to the mandril.

Figure 5 is a scrap cross sectional view also showing the strips leading to the mandril.

Figure 9 is a general perspective view of a normal machine for producing helically wound tubes.

Figure 10 is a view in cross section through the cutting mechanism of a machine according to my invention.

Figure 11 is a part sectional view on line 7—7 in Figure 10.

Figure 14 is a plan view of a machine according to a modified form of the invention.

Figure 6:
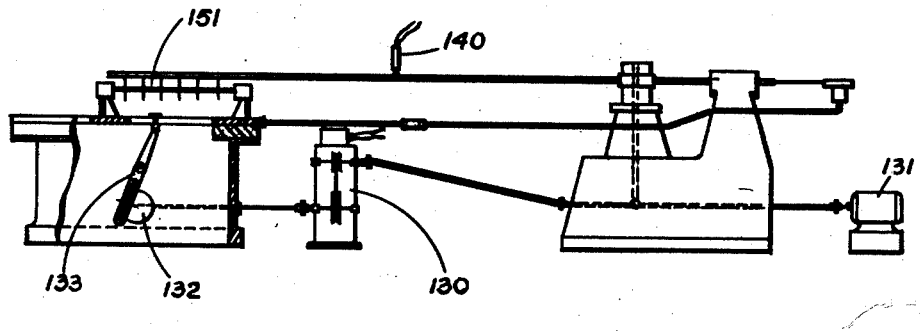
Figure 6 is a diagrammatical view of a modified arrangement.

For the purpose of explaining the general formation of spiral tubing, reference is made to Figure 9. As shown then, the tube 4 is formed on a stationary mandril 1 by the spiral application thereto of two strips 2 and 3 of paper, thin cardboard or other suitable material. These strips 2 and 3 are drawn on to the mandril 1 from sources of supply 5 and 6 respectively and the being formed tube is rotated on said mandril and is screwed along it by means of an endless belt 7. The strip 3 may be a patterned strip (the unitary patterns being applied before or during formation of the tube) and is preferably wrapped with the margins of its convolutions overlapping each other, although if desired the edges of the convolutions may abut each other; the strip 3 also overlaps the strip 2 which is preferably wrapped with the edges of its convolutions abutting each other although if desired its margins may overlap each other. The overlapping margins (when provided) and the two strips 2 and 3 are stuck together during manufacture and for this purpose, the strip 3 is passed through a gumming unit 8, which also carries the supply 6 of the strip 3.

As the tube is being produced, its leading end travels past a cutting saw 15 (Figure 9) or a battery of cutters 151 (Figures 1, 6, 7 and 8), for cutting the tube into lengths such as a stick or bite at locations indicated by distinguishing marks on the tube.

In a preferred arrangement according to the present invention, the cutter mechanism, incorporating either a single cutter or a battery of cutters 151 (which may be initially adjustable along the length of the tube) is actuated to effect the cut or cuts at constant intervals for a given width of strip per given diameter of mandril and length of tube desired, and under the same conditions the speed of production of the tubing is normally constant so that the cuts should be made at predetermined positions in relation to control marks such as printed matter on the tubing. Control means are provided however which function automatically if the tubing is not being cut at the desired locations, to effect an adjustment either of the speed of tube production or of the speed of movement of the cutters so as to correct the fault.

In the preferred construction shown in Figures 1 to 3 there is provided a movable mandril 100, constituting an extension of the fixed mandril 1 which is hollow and this mandril 100 is movable axially of the mandril 1 by means of a rod 101 extending through the mandril 1 to an actuating device 102; the cutters 151 are also connected to the rod 101 by means of a connecting bar, 103. The device 102 consists of a lead screw 104 fixed to the rod 101 and having a screw threaded nut 105 mounted on it; this nut 105 is held axially stationary in a bracket 106. At each side of the nut 105 there is a friction clutch 107, 108 freely rotatable on the lead screw but movable alternatively into and out of engagement with the nut 105 by bellcranks 109, 110 and solenoids 111, 112 respectively. The clutches 107, 108 are rotated in opposite directions by chains 113, 114 and sprockets 115, 116 from an electric motor 117 driving a shaft 118. The drive to the clutch 107 which effects the return of the cutter mechanism is effected through a variable speed unit 119 and reverse gearing 120 by which it will be appreciated that the speed of rotation of the clutch 107 and consequently of the cutter mechanism when returning may be varied according to the length of the tube being cut. The clutches are selected automatically by a rod 121 connected for simultaneous movement with the rod 101; for this purpose the rod 121 has two cams 122 on it which are so arranged as to engage contact switches 123, 124, 125, 126 respectively to energise or deenergise the solenoids 111, 112 at the appropriate times.

The tube winding belt is variable for speed by being driven through chain and sprockets 127, 128 and a speed control unit 129 from the main shaft 118; this speed adjustment permits alternative widths of strip material to be wound per given diameter of mandril.

A light ray scanning device or a counting device is provided incorporating a light ray and step by step relays which is so located as to be influenced by control marks on the strip material (which may be constituted by part of the pattern if the strip is a patterned strip). This light ray scanning device or counting device may be located at any suitable position for observing the said control marks and it has a part associated with it (conveniently situated at the position marked "x" in Figure 3) whereat the speed control 129 or 119 is situated which functions when registration of the said control marks with the light ray does not synchronise with the operation of the cutter mechanism, to adjust the speed control 129 to vary the speed of tube production and consequently to correct the fault. Alternatively the said part associated with the light ray may be arranged to adjust the cutter return speed control 119 to vary the return speed of the cutters for the same purpose. The same apparatus that varies the belt speed control may be employed for varying the cutter return speed control or alternatively there may be a separate apparatus for each control.

It is also to be understood that any of the alternative control devices referred to in my said U. S. patent application Serial No. 726,467 may be employed for varying the speed of tube production or for varying the return speed of the cutters.

Alternatively the inclination or position of the patterned strip at the position where it leads to the mandril is varied, as shown in either Figures 4 or 5 in order to advance or retard the positions of the marks relatively to the saw.

The inclination of the said strip may be varied by any suitable means, for example, the length of strip extending between the gumming unit 8 and the mandril may be raised by hand at an intermediate position along the strip. Alternatively, the raising of this part of the strip may be effected by any suitable mechanical means such as a hand wheel 3a and screw 3b arranged to raise or lower a strip guiding member 3c over which the strip passes.

In a further alternative arrangement, the gumming unit is bodily displaced in a direction substantially normal to the said length of strip and the displacement may be effected by hand or by a hand wheel 8a and screw 8b; conveniently the unit is provided with runners 8c engaging track rails 8d. If desired, light ray apparatus may be employed for effecting the desired adjustment automatically under control of control marks on the strip material.

Figure 7:
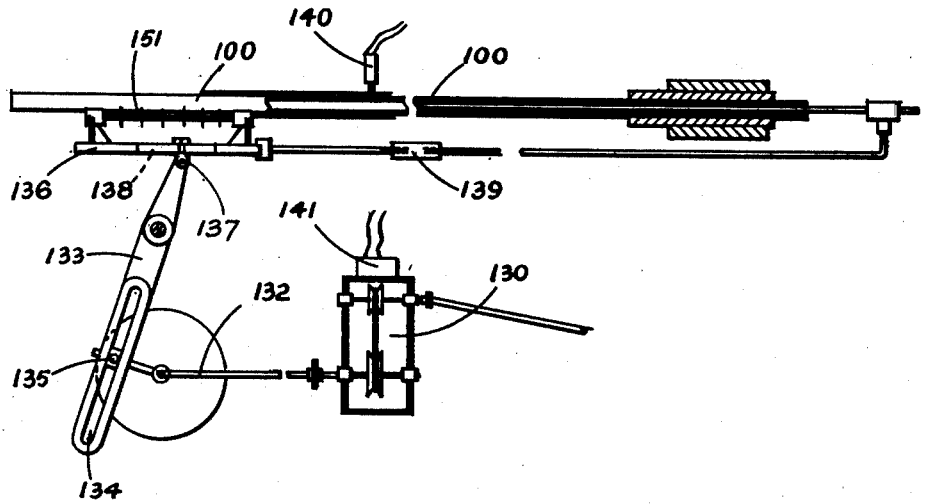
Figure 7 is an enlarged view of part of Figure 6.
Figure 8:
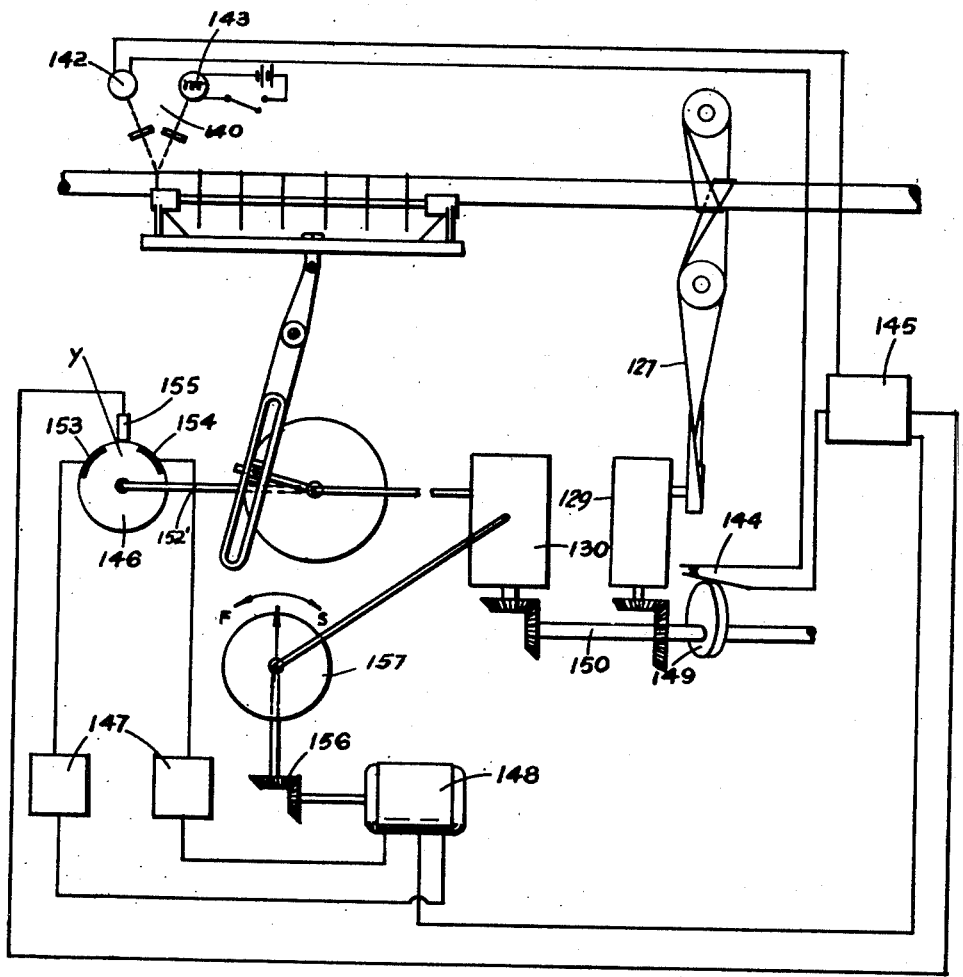
Figure 8 is a circuit diagram.

In a further alternative arrangement shown in Figures 6 and 7 the cutter mechanism 151 is controlled by a P. I. V. (positive, infinite, variable) unit (a positive variable speed transmission adapted to operate with an infinite number of speed ratios) 130 or by a variable speed motor and any of the aforesaid control means may be arranged to vary the P. I. V. or the variable speed motor so as to vary the speed of movement of the cutter mechanism automatically. In the arrangement illustrated there is a motor 131 driving a disc crank 132 through the P. I. V. 130 and the disc crank 132 rocks a connecting lever 133 the throw of which is adjustable by means of a slot 134 in which a fulcrum pin 135 may be locked in any desired position. The lever 133 is connected to a cutter carriage 136 by a bolt 137 which is adjustable in a slot 138 in the carriage so as to provide an independent adjustment for the carriage relatively to the lever. A still further adjustment 139 is provided for varying the cutters relatively to the mandril 100. An observing unit 140 is provided for observing marks on the being formed tube and this unit in turn influences an electronic control 141 for the unit 130; it thus follows that the movement of the cutters is synchronised with the movement of the tube and that the speed of movement of the cutters is automatically varied according to the early or late arrival of the marks on the tube at the observing station.

The scanning device may be influenced by control marks on the tube or strip as previously mentioned and also if desired in conjunction with the end of the being formed tubing; furthermore the scanning device may transmit the desired movement to the speed control device by any suitable means. In one specific example shown in Figure 8 the scanning device 140 consists in the main of a photo-electric cell 142 and a light source 143 and the light source emits a light ray which is focussed on a fixed point in the path of the being formed tubing. The said cell is arranged in circuit with a switch 144, an amplifier 145, a commutator 146, relays 147 and a reversible motor 148. The switch is actuated by a cam 149 which is rotated by a shaft 150 in such manner as to complete one revolution for a predetermined length of tube produced. (This length may constitute the length produced between successive cutting operations or predetermined cutting operations.) The commutator 146 is rotated, for example, by a shaft 152' from the cutter traversing shaft also in such manner as to complete one revolution for each cutting operation and this commutator has contacts 153 and 154 electrically connected one to each relay 147 and arranged to engage periodically with a fixed contact 155 in circuit with the photo-electric cell. If desired a pair of spaced contacts may be fixed and the single contact may be movable. The reversible motor 148 adjusts an advance or retard speed control device 157 through suitable gearing 156.

The relays 147 are each designed to be operated by a transitory impulse and are each provided with an adjustable holding device to determine the duration and the end of the speed correction applied per cut. It is to be understood that either or both of the variable speed devices 129 and 130 may be substituted by variable speed motors or the like and that the position of switch 144 and commutator 146 can be interchanged. In any event the speed control device 157 operates in conjunction with the driving mechanism associated with commutator 146 whether this mechanism be the cutter traversing mechanism or the tube winding mechanism.

The arrangement is such that the tubing is cut every time the commutator has been rotated into such a position that the fixed contact 155 is disposed in a gap Y between the contacts 153, 154 and the cutting operation is so synchronised with the tube winding means that in normal circumstances each time the control mark reaches the light ray the tube is cut. The arrangement is also such that each time the control mark reaches the light ray the switch 144 is closed and the photo cell provides an impulse in the circuit and providing that the control mark arrives at the light at the right time in the manner above referred to the said impulse is not transmitted to the relays 147 because the circuit is broken by the contact 155 being disengaged from the contacts 153, 154. If, however, the control mark arrives too early at the light ray, that is to say, before the commutator has been rotated into the aforesaid position, and consequently before the cutting phase has been reached, the impulse provided by the photo-cell is transmitted through the contact 155 and the contact 153 (assuming that the commutator rotates in an anti-clockwise direction) to the appropriate relay 147; this results in the motor 148 being actuated to adjust the P. I. V. so as to increase the speed of traverse of the cutter mechanism. On the other hand, if the control mark arrives late at the light ray, the other contact 154 of the commutator will then be in contact with the fixed contact 155 and the result is that the motor 148 is actuated through the appropriate relay to adjust the P. I. V. so as to decrease the cutter traversing speed. In this manner the cutter traversing speed is varied automatically so that the tubing is cut in the desired manner.

If desired the motor 148 may be arranged to adjust the speed of the tube winding means in addition to or in lieu of adjusting the cutter traversing speed.

The light source 143 may be energised by any suitable means and a switch may be provided. If desired also there may be provided any suitable means for controlling the light ray manually or automatically as desired, for example, there may be provided a shutter or sector disc member interposed between the light source and the being formed tubing, and this shutter or disc may be provided with an aperture. The shutter or disc is movable into and out of a position whereat the light ray registers with the aperture, for example by being rotatably mounted and by providing suitable motion transmitting means from a driven shaft of the machine.

Fig. 9 is a perspective view of a standard single-cut tube winding machine, but it should be understood that the present machine invention relates only to continuous types of machines.

Reference to Figure 9 discloses that the strips pass to the mandril 1 through suitable guiding means 9, and that the machine is driven by an electric motor 10, the angle of the belt 7 being adjustable by hand wheel 11 and its tension by hand wheel 12.

It will be appreciated that the tube 4 is formed as a continuous process. If desired successive lengths may be severed from the end of the tube as it comes from the mandril 1. For this purpose, according to the prior art, the end of the tube made contact with a target 13 placed to receive it so that contact of the tube end with the target closed contacts of a switch 14 and brought into operation a saw 15 which cut off a length of the tube. 16 indicates a steady for the end of the tube.

In the sawing mechanism shown in Figs. 9–11, the rotary saw 15 is driven by electric motor 17. It is mounted on a bracket 19 which, when switch 14 is operated by target 13, swings on rod 20 to carry the saw blade through the tube 4 and also traverses along said rod 20 at the same longitudinal speed as the tube. For this purpose there is a motor 21 driving a shaft 22 (through friction roller disc 22a) (Figs. 10 and 11) which in turn drives a drum shaft 23 through gearing 24. A drum 25 is freely rotatable on shaft 23, and is formed with an endless spiral groove 26; it may be driven from the shaft 23 by the engagement of a pawl 27 on the drum with a ratchet wheel 28 on the shaft. This engagement is normally prevented by a spring-loaded catch 29, but when switch 14 is operated solenoid 30 is energized to release the catch so that the drum rotates for one revolution. Since the bracket 19 has a follower 31 engaged in track 26, the saw 15 is thereby reciprocated.

In order to move the saw 15 transversely to the tube at each end of its traverse there are a pair of cam discs 52 one at each end of drum 25 which displace a bar 33 along which a truck 34 on bracket 19 travels. The saw 15 may be partly shrouded in a cowl 35 from which saw-dust is extracted by a motor-driven fan 36 and a flexible pipe 37. Thus a cut is made at intervals, each cut taking place after a predetermined length of tube has been formed. Although in the prior art the end of the tube was used to actuate the cutting mechanism, according to the present invention the cut is regulated to sever the tube between successive patterns by means of a detector actuated, by a control mark on the strip. The detector conveniently comprises a light-sensitive cell so that the control mark need not necessarily consist of a physical irregularity in the strip (such as for example a notch) but may consist of a surface characteristic such for example as a portion of the pattern itself, or a distinguishing mark separate from the pattern printed on the strip. The cell may operate by the modulation produced by the light falling on it, by the absence or presence of a control mark in a light beam projecting towards it by a suitable source of light. Thus for example each time a control mark presents itself in the beam it varies the amount of light falling on the light cell and evokes a response from the latter which, operating through a suitable relay system, causes a cutter to cut a length off the end of the tube. The control mark may contrast with the adjacent surface of the strip in that it is more translucent or more opaque or has different reflecting properties. It will be appreciated that any practicable portion of the spectrum may be employed to actuate the "light sensitive cell" herein referred to.

It will be appreciated that if the normal spacing required at the end of each tube length for purposes of trim in subsequent operations is ⅜ inch—this is equivalent to a total measurement of ¾ inch on each tube. It will be appreciated that if the depth of any rim approximates to ¾ inch, then it is immaterial as regards economy of material whether this space is occupied by a standard printed design or by a blank (for example incorporating a circumferential ring whereat the saw cut should occur). If the former method is employed then of course a distinctive control mark must be included in the standard printing. If the latter method is employed then the circumferential ring referred to may also be used as the control mark for the light ray apparatus.

Figure 12:
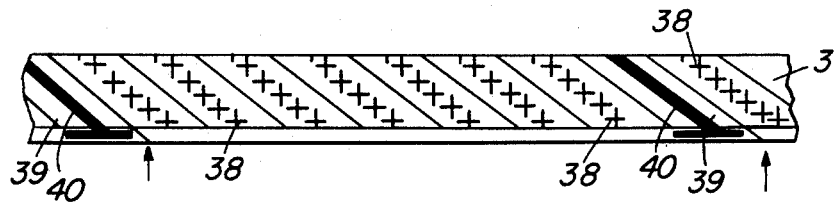
Figure 12 is a diagram illustrating a length of strip material.
Figure 13:
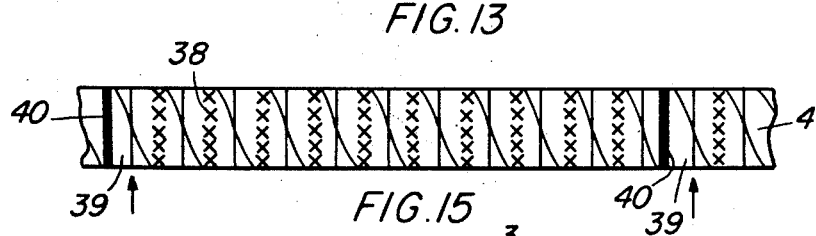
Figure 13 shows a length of the wound tube.

Turning now more particularly to Figs. 12, 13, 14, 15 and 16, it is required to provide repeat patterns 38 along the length of the tube and for this purpose the patterns are repeated diagonally along the length of the outer strip 3 as shown in Figure 3, the obliquity being such in relation to the pitch of the helix that in the finished tube each pattern is disposed circumferentially or at right angles to the axis of the tube. The circumferential length of each pattern, measured in the diagonal direction of the strip 3, is slightly greater than the circumference of the finished tube to allow for the lap joint. Because it is desired to leave in the finished tube blank spaces where the saw cut is to be made, as at 39 Figure 13, certain blank spaces 39 Figure 12 are left along the strip 3.

Figure 15:
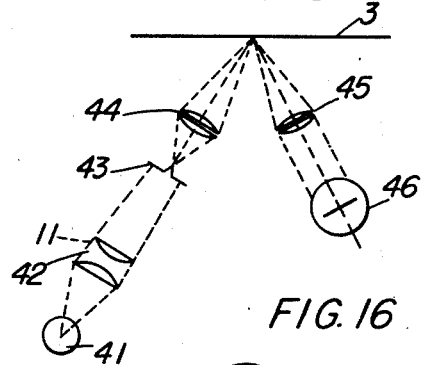
Figure 15 illustrates an arrangement of the line sensitive cell employed in the machine of Figure 14.
Figure 16:
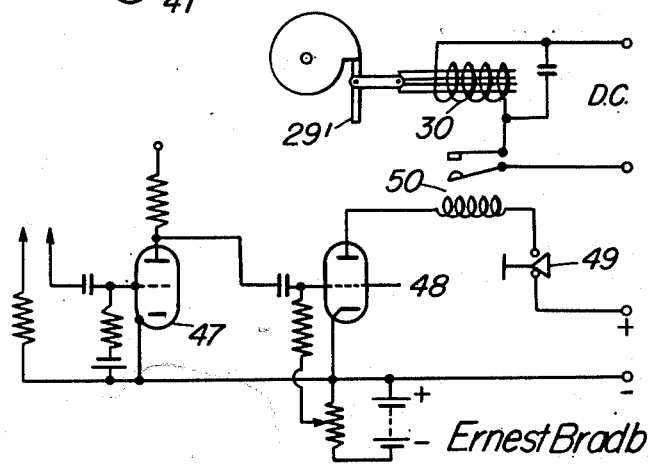
Figure 16 is a wiring diagram for the form of machine showing the Figures 14 and 15.

At predetermined intervals along the length of the outer strip 3 a line 40 is printed to form a control mark and as the strip 3 traverses towards the mandril these control marks present themselves one after another in a beam of light which is projected onto the strip from a lamp 41 by way of a condenser 42, slit 43, and a lens 44, Figure 15. The beam of light is reflected from the surface of the strip by way of a lens 45 onto a light-sensitive cell 46, and the presence or otherwise of a control mark 40 in the beam of light therefore modulates the light beam and determines the amount of light falling on the cell 46 with a resultant variation in the electric response of the latter. The cell thus actuated serves to control the saw blades 15 to sever a length of tube from the tubing emerging from the mandril. It therefore follows that each cut is placed in a definite and invariable location with respect of the patterns 38. This will readily be understood when it is appreciated that to achieve the required result, the linear travel of the tubing 4 (in the axial direction of the mandril) must have a fixed and invariable relation to the overall length of the tube occupied by a pattern or series of patterns and that this last-mentioned tube-length is determined by the developed length of strip 3 wound on it, and this in turn bears a fixed relation to the distance longitudinally of the strip 3, between control marks 40.

The light-sensitive cell 46 is connected to an amplifying circuit (Figure 16) containing a valve 47 to amplify the impulses. The latter are applied to the grid of a gas filled relay 48 so that current flows between the anode and cathode of the relay each time a control mark 40 is presented on the beam. Thus current flowing in circuit containing the reset switch or limit switch 49 operates a further relay 50 to energise the solenoid 30 which performs the mechanical functions of releasing catch 29 Figure 10 or the equivalent catch 29' Figure 16. Therefore, the immediate response of the light-sensitive cell is that the motor 17 and saw blade 15 are made to traverse lengthwise of the being-formed tube at the same linear speed of the tube 1. During this traverse the saw blade is moved laterally along the tube to produce a cut after which the saw is moved laterally in the reverse direction and the saw and motor are returned by the cam barrel 25. This lateral movement may be produced by any convenient means such as already described with reference to Figures 10 and 11, and the motor swings about the guide 20. At the extremity of its travel the motor operates a limit switch or re-set switch 49 to break the circuit through the gas filled relay 48 so that the catch 29' is re-set under the influence of spring 51 (Fig. 11).

Figure 14 shows that the foregoing scanning apparatus having the general reference 56 may be applied to a third strip 3'. This third strip 3' may be applied by adhesive by passing the strip through or over a gum applying device 8 as before described with reference to the strip 3.

The apparatus may be associated with the gum-applying device 8 or it may be mounted on a trolley as a portable unit in the latter case the gum-applying device 8 may be movable into such a position that the unit may be interposed between it and the machine proper.

The linear production of tubing, for a given linear consumption of a strip, may be varied by varying the spirality of the tube windings (thereby varying the overlap or butt joint between successive convolutions). This result may be achieved by adjusting the belt angle. Such an adjustment is effected manually by the operator by means of wheel 11.

Reference is hereby made to my copending application Ser. No. 726,467, filed February 5, 1947 (now Patent No. 2,623,445), above referred to, where the method of producing helically wound containers disclosed herein is described and claimed.

Reference is also made to my copending application Ser. No. 322,370, filed November 25, 1952, where I claim a parcelled out form of the general method of producing helically wound containers disclosed in the present application.

I claim:

1. A machine for the production of helically wound tubes comprising means for winding strip material having control marks thereon helically on a mandrel to form tubing and simultaneously moving said tubing axially of said mandrel, cutting mechanism for severing lengths from the tubing as it is produced, traversing mechanism for moving said cutting mechanism axially of said mandrel, and control means comprising adjusting mechanism for changing the relative speeds of said cutting mechanism and said tubing, and an observing device located adjacent the work and fixed in relation thereto and sensitive to control marks on the work passing thereby, said observing device being adapted to operate said adjusting mechanism when stimulated by a control mark on the work whereby said tubing may be cut at predetermined spaced locations along the helically disposed edges of the strip.

2. Apparatus for the production of helically wound tubular cartons of definite length and having designs printed thereon comprising means for winding strip material having unitary patterns, control marks and surplus trim spaces thereon helically on a mandrel to form tubing and simultaneously moving said tubing axially of said mandrel, cutting mechanism for severing lengths from the tubing as it is produced, traversing mechanism for moving said cutting mechanism axially of said mandrel, and control means comprising adjusting mechanism for changing the relative speeds of said cutting mechanism and said tubing and an observing device located adjacent the work, fixed in relation thereto and sensitive to control marks on the work passing thereby, said observing device being adapted to operate said adjusting mechanism when stimulated by a control mark on the work whereby said tubing may be cut at spaced locations in predetermined relation to the helically disposed edges of the strip, in combination with a printing cylinder adapted to print an integral number of complete patterns on said strip material for each revolution of the cylinder, there being a commutator in the adjusting device to transmit the impulses of the observing device for the purpose of adjusting the relative speeds when out of synchronism, the angle of the patterns and the width of the material being so related to the size of the cylinder as to bring about the containment of the integral number of complete patterns aforesaid within each helix.

3. Apparatus according to claim 1 having a travelling belt for winding the strip material; and means for driving the belt, and wherein said adjusting mechanism comprises a variable speed control device associated with said belt driving means, whereby the speed of the tubing along the mandrel may be varied and control means for automatically adjusting the speed control device so as to vary the speed of traverse of the tubing and to maintain same in synchronism with the cutter mechanism.

4. Apparatus according to claim 1 having a variable speed motor for traversing the cutter mechanism.

5. Apparatus according to claim 1 wherein the observing device comprises a light ray device associated with the tube or strip and impulse responsive devices associated with said adjusting device.

6. Apparatus according to claim 1 wherein the adjusting mechanism comprises means for varying the angle of inclination of the strip leading to the mandril.

7. A machine according to claim 1 wherein the observing device includes a light-sensitive cell for creating an impulse in an electric circuit, and a light source for directing a light beam at predetermined times under control of the moving work on to the cell to energize it.

8. A machine according to claim 1 wherein the observing device comprises a light sensitive cell for creating an impulse in an electric circuit and a light source for directing a light beam at predetermined times under control of the moving tube or strip on to the cell, and wherein said adjusting mechanism comprises a commutator for transmitting the impulse at predetermined times to suitable impulse responsive devices arranged to vary the relative rates of traverse of the tubing and cutting mechanism.

9. A machine for the production of helically wound tubes comprising means for winding strip materially helically on a mandrel to form tubing, cutting mechanism for severing lengths from the tubing as it is produced, traversing mechanisms for moving the tubing and the cutting mechanism axially of said mandrel and control means for varying the relative speed of traverse of the tubing and the cutting mechanism, the control means comprising a speed adjusting device associated with said traversing mechanism actuating means comprising a reversible electric motor for adjusting the said device to vary the speed of said traversing mechanism, an electrical relay for actuating the motor, a selector for rendering the said device operative and inoperative when desired, said selector having a rotor, a single stator contact and a pair of spaced contacts on the rotor arranged in such manner that during rotation of the rotor the stator contact engages first one of the rotor contacts, then becomes located in the gap between them and then engages the other rotor contact, means for rotating the selector in such manner that at each instance of a cut being made the stator contact is located in the said gap, a switch for determining the period during which the control means may operate, means for actuating this switch once for each cutting operation, a light source, and a light sensitive cell arranged to be influenced by a light ray from the light source to create an impulse in the circuit under control of the moving tube or strip whereby the desired synchronism between the traverse of said tubing and said cutting mechanism is obtained.

ERNEST BRADBURY ROBINSON.

REFERENCES CITED

The following references are of record in the file of this patent:

UNITED STATES PATENTS

| Number | Name | Date |
|---|---|---|
| 1,549,429 | Bartlett | Aug. 11, 1925 |
| 1,625,470 | Jauch | Apr. 19, 1927 |
| 1,698,250 | Adams | Jan. 8, 1929 |
| 1,929,267 | Weber | Oct. 3, 1933 |
| 2,062,303 | Ferguson | Dec. 1, 1936 |
| 2,199,708 | Maxfield | May 7, 1940 |
| 2,249,820 | Gulliksen | July 22, 1941 |